United States Patent [19]

Dewey et al.

[11] Patent Number: 4,483,632

[45] Date of Patent: Nov. 20, 1984

[54] ISOTHERMAL PANEL ASSEMBLY FOR TERMINATING A PLURALITY OF THERMOCOUPLE LEADS

[75] Inventors: Keith L. Dewey, Reynoldsburg; Eugene C. Varrasso, Heath, both of Ohio

[73] Assignee: Owens-Corning Fiberglas Corporation, Toledo, Ohio

[21] Appl. No.: 398,537

[22] Filed: Jul. 15, 1982

[51] Int. Cl.³ .......................... G01K 1/14; G01K 7/12
[52] U.S. Cl. .................................. 374/182; 374/165; 374/208; 361/389; 361/401
[58] Field of Search ............... 374/181, 182, 179, 165; 156/222; 361/401, 383, 389, 368; 339/210 R, 263 R, 17 B; 364/178, 557

[56] References Cited

U.S. PATENT DOCUMENTS

| | | | |
|---|---|---|---|
| 2,471,011 | 5/1949 | Shapiro | 361/383 X |
| 2,654,078 | 9/1953 | Arthur | 339/263 |
| 2,690,462 | 9/1954 | Duckwall | 339/263 R X |
| 3,088,091 | 4/1963 | Linn | 339/210 M X |
| 3,123,743 | 3/1964 | Perlmutter | 361/383 |
| 3,299,946 | 1/1967 | Von Recklinghansen | 361/383 X |
| 3,356,904 | 12/1967 | Yonkers | 361/389 |
| 3,648,523 | 3/1972 | Kemper et al. | 374/182 |
| 3,716,820 | 2/1973 | Deakin | 339/210 R X |
| 3,717,179 | 2/1973 | Clark | 339/210 R X |
| 3,757,269 | 9/1973 | Baumgartner | 339/263 R X |
| 4,020,443 | 4/1977 | LeRoy et al. | 374/165 X |
| 4,091,440 | 5/1978 | Gelin et al. | 361/399 X |
| 4,130,019 | 12/1978 | Nitschke | 374/181 X |
| 4,131,756 | 12/1978 | Smith | 374/181 |
| 4,147,061 | 4/1979 | Wester et al. | 374/110 |
| 4,221,923 | 9/1980 | Nagao et al. | 374/182 X |

Primary Examiner—Daniel M. Yasich
Attorney, Agent, or Firm—Ronald C. Hudgens; Patrick P. Pacella; Ronald E. Champion

[57] ABSTRACT

A panel assembly for terminating a plurality of thermocouple leads is disclosed. The panel assembly has sufficient mass that it can stabilize at the temperature of the surrounding air. All thermocouple termination posts are of a common metal such as copper so that all subsequent leads can be copper and thereby reduce termination errors due to subsequent thermoelectric effects. A temperature measuring device is embedded in the mass of the panel assembly for measuring the temperature of the termination points of the thermocouple leads. Recorder jacks are provided so that an external recorder may record the outputs of the thermocouple.

13 Claims, 4 Drawing Figures

U.S. Patent  Nov. 20, 1984  4,483,632
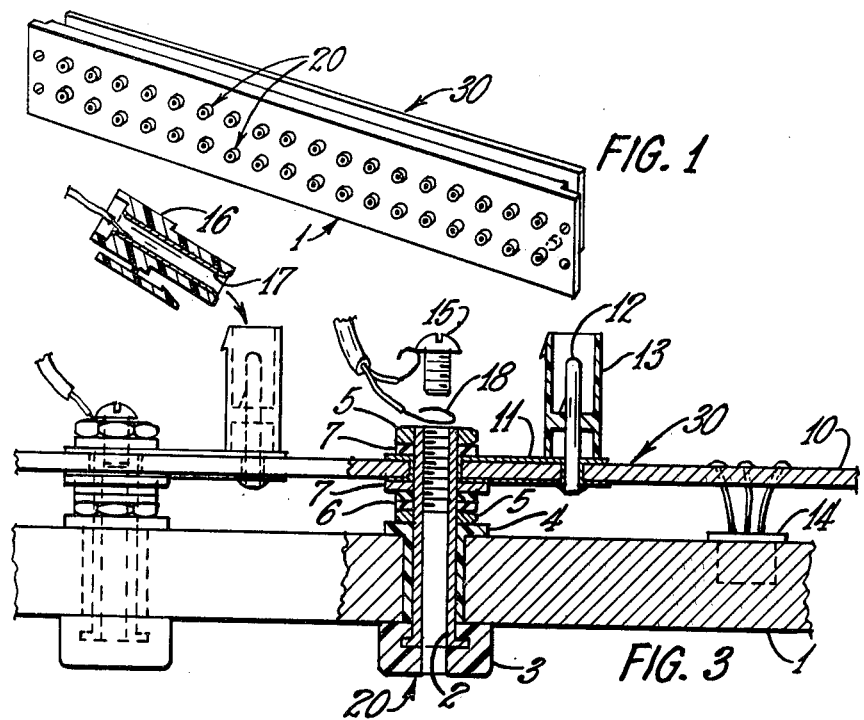
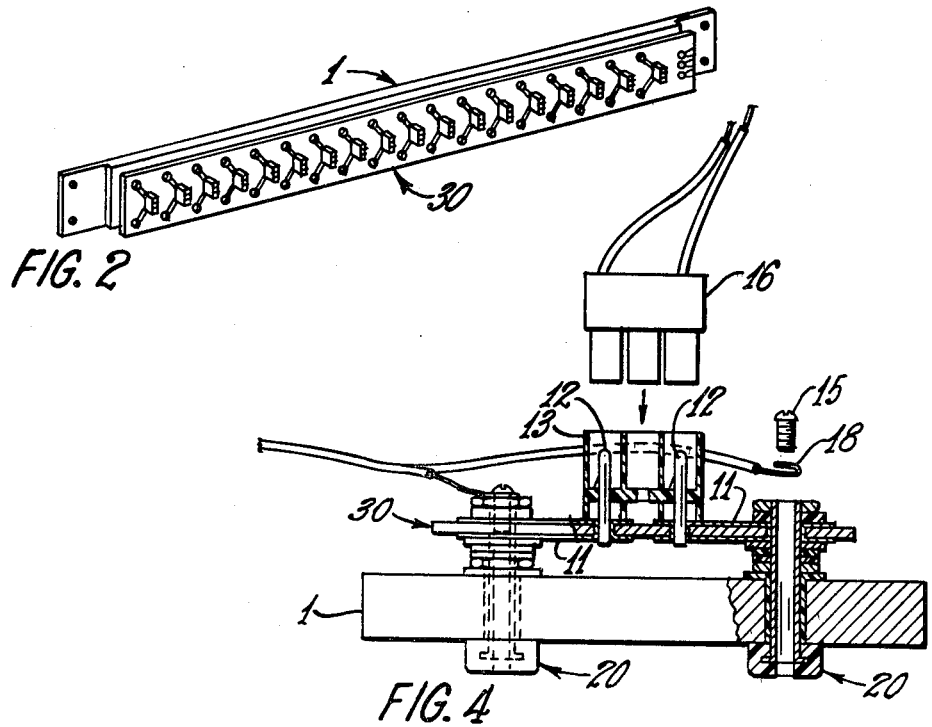

ISOTHERMAL PANEL ASSEMBLY FOR TERMINATING A PLURALITY OF THERMOCOUPLE LEADS

TECHNICAL FIELD

This invention relates to temperature measurements using thermocouples consisting of wires of dissimilar metals joined together which produce an electromotive signal when heated and particularly to an apparatus for terminating a plurality of these thermocouples.

BACKGROUND ART

When two dissimilar metals are connected and that junction exposed to an elevated temperature, a thermal electromotive force is generated. This phenomenon is known as the Seebeck effect and is the basis of temperature measurements using thermocouples. When two similar metals are joined, no thermoelectric effect takes place. Theremorcouple leads are, therefore, made from the same material from which the thermocouples are made. Eventually, in the circuit, however, connections must be made to copper, such as at the binding post of a potentiometer or other measuring device. Unfortunately, these connections form two new junctions which are themselves thermocouples. The error produced by these new thermocouple junctions can be eliminated by placing the copper to thermocouple lead junction in a bath of melting ice. This keeps the two junctions at the same temperature and keeps that temperature constant. This cancels the thermoelectric effect of the new junction. If all additional terminations are copper to copper, no new thermal electromotive error is introduced. The electromotive force generated by the thermocouple is then measured with a potentiometer. The electromotive force generated by the thermocouple when an ice bath is used with the reference junction is represented by the equation:

$$E = At + \frac{Bt^2}{2} + \frac{Ct^3}{3}$$

where E equals electromotive force generated by the thermocouple; t equals temperature in degrees Celsius; A, B, C are constants dependent upon the materials used to fabricate the thermocouples. If the thermocouple to copper lead junctions are at some temperature other than the melting point of ice, then the above equation must be corrected by adding a term dependent upon the temperature of the junction.

$$E = E_c + E_r$$

where E equals electromotive force generated by thermocouple if an ice junction were used; $E_c$ equals correction factor; $E_r$ equals electromotive force actually measured. Once the electromotive force is determined, it is a simple matter to look up the temperature in a chart of electromotive force versus temperature which have been developed for various thermocouples and published in books such as the CRC Handbook of Chemistry and Physics.

Electronic devices are available to replace the ice bath for reference junction compensation. One such device is described by Ihlenfeldt et al. In U.S. Pat. No. Re. 30,735. The problem encountered when using a plurality of thermocouples is that a separate ice bath junction or electronic junction compensation device is needed for each thermocouple.

The present invention overcomes this problem by terminating all thermocouples at a common point to an isothermal block such that all terminations are at the same temperature. The temperature of the isothermal block which is used for termination is then measured. A method then can be used to simultaneously compensate all thermocouple signals as is disclosed in the Applicants' co-pending application, Ser. No. 398,491.

DISCLOSURE OF THE INVENTION

This invention is an apparatus for terminating a plurality of individual thermocouple leads to a common panel assembly. All termination points are held at the same temperature by a mass of metal. The mass of metal forms a faceplate which structurally holds the thermocouple termination points and maintains them at a common temperature. The faceplate is electrically insulated from the individual termination points to prevent disturbing the thermocouple signals. The faceplate also serves to connect the panel assembly to a standard equipment rack not shown. An integrated circuit temperature transducer is embedded in the mass of metal forming the faceplate to determine the temperature of the faceplate. Vertical pairs of holes are spaced longitudinally down the faceplate to accept jacks which form the thermocouple terminations.

The thermocouple terminations are formed from jacks constructed of hollow copper tubes which have an electrically insulating plastic tip molded on one end. The plastic tip is bigger in diameter than the outside of the copper tube, and has a hole in the middle concentric with and the same diameter as the inside of the copper tube. The hole diameter is chosen such that a standard equipment jack may fit through the plastic tip and make electrical contact with the inside diameter of the copper tube. The other end of the copper tube, opposite the end with the plastic tip, has internal threads formed in the interior of the tube. This thread receives a copper screw which forms the binding post for the thermocouple lead. The exterior of the copper tube also has threads formed on it for mechanical attachment to other components in the assembly.

The jacks have an electrically insulating sleeve whose length is equal to the thickness of the faceplate placed over the exterior of the tubular member of the jack. This insulating sleeve has an interior diameter larger than the outside diameter of the copper tubular member of the jack and an outside diameter smaller than the interior diameter of the hole in the faceplate. The jack with the insulating sleeve fits through the hole in the faceplate such that the plastic tip of the jack is on the exterior of the faceplate. An insulating washer is then placed over the exterior threaded portion of the copper sleeve, and a copper nut is threadably engaged with the copper sleeve of the jack. In this manner, the jack is firmly attached mechanically to the faceplate but is electrically isolated from the faceplate by the plastic tip on the front side, the sleeve as it passes through the faceplate, and the insulating washer on the back side. A printed circuit board is then placed over the jack assemblies which protrude through the faceplate. The body of the printed circuit board is composed of a flat sheet of non-conductive material. The printed circuit board has pairs of vertical holes spaced longitudinally along its length which correspond to the diameter and location of the holes in the faceplate. A conductive copper surface is imprinted on the board around each of these holes and leads to an adjacent position where copper male terminals are soldered in position. After the printed circuit board is placed over the jacks, a copper washer and copper nut secure the printed circuit board to each of the jack assemblies. The board is then electrically and mechanically joined to each jack assembly. The signal from the jack is led by the copper circuitry of the printed circuit board to the copper terminal. A female, non-conductive insulator block connector is placed over pairs of terminals corresponding to the positive and negative inputs of each of the thermocouples. This insulator block is held in place mechanically by barbs on the terminals which have been soldered to the printed circuit board. The insulator block and terminals provide a convenient and quick way for connecting the thermocouple signals to external devices.

The integrated circuit temperature transducer which has been embedded in the metal mass of the faceplate has its leads soldered to the printed circuit board. Copper exit wires are then soldered to the printed circuit board such that the integrated circuit temperature transducer signal can be led to external devices.

In operation, copper screws are threaded into the internal threads of the jack assemblies. A thermocouple lead, for instance the lead composed of platinum plus 10% rhodium, is wrapped around the body of the screw and the screw is turned until it makes a tight joint with the jack. The other lead of the thermocouple, for instance a lead composed of pure platinum, is similarly attached to the jack immediately below the jack above. In this manner, the positive signal is led from the jack across a printed circuit board by means of the copper circuitry to the output terminal. The other terminal, which is inside the insulation block, leads back to the negative signal of that particular thermocouple. This entire panel assembly is designed to fit into a standard equipment rack. An operator standing in front of the rack may use an external recording device by plugging the recorder terminals through the plastic tips of the jack and thus receiving the signal from the thermocouple.

BRIEF DESCRIPTION OF THE DRAWINGS

FIG. 1 is a front view of the isothermal panel assembly.

FIG. 2 is a back view of the isothermal panel assembly.

FIG. 3 is a cross section of the isothermal panel assembly running longitudinally.

FIG. 4 is a cross section of the isothermal panel assembly running vertically.

BEST MODE FOR CARRYING OUT THE INVENTION

The main purpose of this invention is to conveniently terminate a plurality of thermocouple leads at a common panel such that all the terminations are held at the same temperature. FIG. 3 shows a preferred embodiment of an isothermal panel assembly for accomplishing this end.

A metallic faceplate or first layer 1, preferably aluminum, has vertical pairs of holes spaced longitudinally down its length as shown in FIG. 1. Each pair of holes corresponds to the positive and negative leads of a thermocouple. In the preferred embodiment, the isothermal panel assembly is used to terminate 18 thermocouples. There would be, therefore, 18 pairs, or 36 individual holes spaced in faceplate 1. The faceplate 1 is machined to fit into a standard equipment rack (not shown) with appropriate holes for fastening as shown in FIGS. 1 and 2. The mass of the faceplate 1 is such that it will come to thermal equilibrium with the ambient air and hold all termination points at the same temperature as will be seen from the following discussion.

The holes in the faceplate 1 receive jack assemblies 20 which consist of a copper tubular member 2 with a plastic tip 3 molded on one end. The plastic tip 3 has a flat backside designed to fit flush with faceplate 1 and has a hole molded into the front which is concentric with and the same diameter as the inside of copper tubular member 2. The inside diameter of the copper tubular member 2 is sized to accept an equipment or recorder plug (not shown). The end of the copper tubular member 2 opposite the plastic tip 3 has external and internal threads formed thereon.

An insulating sleeve 4 having an inside diameter equal to the outside diameter of the copper tubular member 2 of jack assembly 20 and an outside diameter equal to the inside diameter of the holes in the faceplate 1 has a flange molded integral with one end. The insulating sleeve 4 is inserted into the hole in the faceplate 1 from the backside. The tubular member 2 of jack assembly 20 is placed through the insulating sleeve 4 from the front side of faceplate 1. A copper nut 5 is placed over the external threads of copper tubular member 2 and tightened to hold the jack assembly 20 firmly to the faceplate 1. The jack assembly 20 is thus completely electrically isolated from the faceplate 1 by the plastic tip 3 of jack assembly 20 and the flange and body of insulating sleeve 4.

A printed circuit board or second layer 30 is fabricated of a non-electrically conductive substrate 10 coated with conductive copper circuitry 11. Pairs of holes are spaced longitudinally through the non-conductive substrate 10 corresponding to the hole spacing in faceplate 1. The diameter of the holes are slightly greater than the outside diameter of the copper tubular member 2 of jack assembly 20. Smaller holes slightly larger than the copper terminals 12 are spaced inboard toward the center of the substrate 20 to accept the terminals 12. The copper conductive elements 11 are printed through the holes and on both sides as substrate 10 to electrically connect the hole which will receive the jack assembly 20 to the hole which will accept the terminal 12. In this manner, any signal impressed on one jack assembly 20 will be impressed on only one output terminal 12. The terminal 12 is pressed into its proper hole and is soldered to the copper conductive element 11 of printed circuit board 30. A female insulator block 13 is positioned over a pair of terminals 20 and is held in place by barbs on the body of terminal 12 which engage a molded rib on the insulator block 13. The terminal 12 and insulator block 13 are designed to accept a male insulator block 16 holding female connector 17 to which are soldered leads for ultimate connection to external devices.

To complete the assembly, insulating washers 6 are placed over the tubular member 2 of the jack assembly 20 to act as insulators and spacers. A copper washer 7 is then placed over the tubular member 2. The printed circuit board assembly 30 is placed over the jack assemblies 20 which are held in place on faceplate 1. Copper washers 7 are then placed over the tubular members 2 of jack assembly 20 and a copper nut 5 is threadably engaged with the external threads on the tubular member 2. The copper washers 7 placed on each side of the printed circuit board assembly 30 insure good electrical contact between the jack assembly 20 and a printed circuit element 11 of the printed circuit board 30.

An integrated circuit temperature transducer 14, such as a Model AD590 Temperature Transducer manufactured by Analog Devices, which had previously been imbedded in faceplate 1 is now soldered to copper pads printed on circuit board assembly 30. Provisions are incorporated into printed circuit board assembly 30 to solder external leads to these connections such that the signals from the temperature transducer 14 can be led to external devices. Copper screws 15 are threadably engaged to the internal threads formed in the tubular member 2 of jack assembly 20. The thermocouple input leads 18 are wrapped around the copper screw 15 and the screws are tightened into the threaded opening of tubular member 2. The thermocouple signal, which is carried by thermocouple lead 18, is electrically transmitted to jack assembly 20 by the combination of copper screw 15 and the copper tubular member 2 of jack assembly 20. The signal is transmitted from jack assembly 20 by the copper nut 5 and copper washer 7 to the copper printed element 11 on the printed circuit board 30. Printed circuit element 11 transmits the output signal to the copper connectors 12. When mating insulator block 16 and female connector 17 are inserted into the insulator block 13 and connectors 12 on printed circuit board 30, the signal can be led to external devices. All connections, terminations and leads in this invention, except for the input thermocouple leads, are copper. No thermoelectric effect takes place between common metals so that the only thermolelectric effect other than at the thermocouple junction occurs at the termination to the isothermal blocks. Since temperature tranducer 14 measures this temperature, corrections can be made.

The faceplate 1 is of sufficient mass that it stabilizes to the temperature of the surrounding air. The faceplate 1 acts as a heat sink for the jack assembly 20 by keeping the jack assembly at this common temperature. Temperature transducer 14 continuously monitors the temperature of faceplate 1.

INDUSTRIAL APPLICABILITY

This invention provides a quick and inexpensive method of terminating a plurality of thermocouple leads to an isothermal panel assembly. All thermocouple leads are terminated at the same area and, due to the mass of the metal in the faceplate, are kept at the same temperature which minimizes the error due to thermoelectric effects of the terminations.

I claim:
1. An isothermal panel assembly for terminating and maintaining a plurality of thermocouple leads at a common temperature comprising:
    jacks for providing a means to connect thermocouple input leads while providing recorder termination means;
    said jacks interconnecting a first layer with a second layer, said first layer being a mass of metal to maintain the jacks at the same temperature as said first layer such that the mass of metal is electrically insulated from, but thermally conductive to, the jacks, and said second layer being a printed circuit board for interconnecting the thermocouple input from the jacks to an output terminal; and a temperature transducer embedded in the first layer having its leads connected to said second layer to determine the temperature of the first layer.

2. An isothermal panel assembly for terminating a plurality of thermocouple leads as recited in claim 1 wherein the jacks are copper.

3. An isothermal panel assembly for terminating a plurality of thermocouple leads as recited in claim 1 wherein the mass of metal is an aluminum block.

4. An isothermal panel assembly for terminating a plurality of thermocouple leads as recited in claim 1 wherein the temperature transducer is an integrated circuit temperature transducer whose electrical output is proportional to the temperature sensed.

5. An isothermal panel assembly for terminating and maintaining a plurality of thermocouple leads at a common temperature comprising:
    (a) a first layer formed of a metallic facepanel of sufficient mass to be thermally stable;
    (b) a second layer being a printed circuit board with output terminals attached thereto;
    (c) jacks protruding through said first layer and electrically isolated from said first layer and electrically connected to said second layer, wherein said first and second layers are at a common temperature; and
    (d) a housing of a temperature transducer embedded in the first layer with the leads of said transducer electrically connected to said second layer, to determine the temperature of the first layer whereby the first layer, the jacks and the temperature transducer are stabilized at the same temperature by said first layer.

6. An isothermal panel assembly for terminating a plurality of thermocouple leads as recited in claim 5 wherein the faceplate is an aluminum plate.

7. An isothermal panel assembly for terminating a plurality of thermocouple leads as recited in claim 5 wherein the jacks, thermocouple termination posts, conductor portion of the printed circuit board and output terminals are copper.

8. An isothermal panel assembly for terminating a plurality of thermocouple leads as recited in claim 5 wherein the temperature sensing device is an integrated circuit temperature transducer whose output is an electrical signal which is proportional to the temperature of the faceplate.

9. An isothermal panel assembly for terminating a plurality of thermocouple leads as recited in claim 5 wherein the jack is a copper tubular member with an insulating cap molded on one end and external and internal threads formed in the other end.

10. An isothermal panel assembly for terminating a plurality of thermocouple leads as recited in claim 9 wherein the thermocouple termination means is a screw threadable engaged with internal threads in the jack.

11. An isothermal panel assembly for terminating a plurality of thermocouple leads as recited in claim 5 wherein the jack is electrically isolated from the faceplate by means of an insulating sleeve which fits outside the jack and inside a hole formed in the faceplate to electrically insulate the jack from the faceplate.

12. An isothermal panel assembly for terminating a plurality of thermocouple leads as rectied in claim 10 wherein the jacks are electrically joined to the printed circuit board by placing a nut on the jack to threadably engage the external threads of the jack, placing the protruding portion of the jack through a hole in the printed circuit board, and then placing a second nut on the jack to threadably engage the external threads of the jack thus locking the jack mechanically and electrically to the printed circuit board.

13. A panel assembly comprising:
   (a) an aluminum faceplate with holes spaced therein:
   (b) jacks having a tubular copper body with an elecrically insulating material molded on one end and external and internal threads formed on the other end to fit through the holes on the faceplate such that the end of the jack having the insulating material molded thereon is in contact with the exterior of the faceplate;
   (c) tubular insulating sleeves, whose outside diameter is less than the diameter of the holes in the faceplate and whose inside diameter is greater than the outside diameter of the tubular copper body of the jack, spaced between the exterior of the jack and the interior and the interior of the holes in the faceplate to electrically insulate the jack from the faceplate;
   (d) an insulating washer placed over the threaded end of the jack and a copper nut threadably engaged with the jack to mechanically attach the jack to the faceplate but to maintain electrical isolation between the faceplate and the jack;
   (e) a printed circuit board of non-conductive material having holes spaced therein corresponding to the hole spacing in the faceplate to fit over the protruding ends of the jacks on the back side of the faceplate and having copper circuitry printed thereon to electrically connect each jack to a copper output terminal which is joined to the printed circuit board;
   (f) an insulation block positioned over and attached to the output terminal which is attached to the printed circuit board;
   (g) copper washers placed over the portion of the jacks protruding through the printed circuit board and a printed circuit board to the jacks and to effectuate electrical continuity between the jacks and the printed circuit board;
   (h) copper screws threadably engaged to the internal threads of the jack to engage and terminate thermocouple leads to effectuate mechanical joining and electrical continuity between the thermocouple lead and the jack; and
   (i) an integrated circuit temperature transducer whose electrical output is proportional to the temperature sensed, joined to a recess in the faceplate and electrically connected to the printed circuit board.

* * * * *